US008763026B2

(12) United States Patent
Delpuch (10) Patent No.: US 8,763,026 B2
(45) Date of Patent: Jun. 24, 2014

(54) FLEXIBLE INTERFACE FOR SECURE INPUT OF PIN CODE

(75) Inventor: Alain Delpuch, Paris (FR)

(73) Assignee: OpenTV, Inc., San Francisco, CA (US)

( * ) Notice: Subject to any disclaimer, the term of this patent is extended or adjusted under 35 U.S.C. 154(b) by 249 days.

(21) Appl. No.: 13/205,361

(22) Filed: Aug. 8, 2011

(65) Prior Publication Data

US 2012/0027200 A1 Feb. 2, 2012

Related U.S. Application Data (63) Continuation of application No. 09/980,271, filed as application No. PCT/IB99/01213 on Jun. 4, 1999, now Pat. No. 7,996,861.

(51) Int. Cl.
| | |
|---|---|
| *H04N 7/16* | (2011.01) |
| *H04N 7/167* | (2011.01) |
| *H04L 9/32* | (2006.01) |
| *H04K 1/00* | (2006.01) |
| *H04L 9/00* | (2006.01) |
| *H04N 5/445* | (2011.01) |

(52) U.S. Cl.
USPC ............. 725/30; 713/152; 713/164; 713/183

(58) Field of Classification Search
USPC ......... 713/152, 182, 183, 194, 184, 200, 202, 713/164; 725/30, 31; 380/28, 209, 205
See application file for complete search history.

(56) References Cited

U.S. PATENT DOCUMENTS

| 4,947,429 A | 8/1990 | Bestler et al. |
| 5,267,149 A | 11/1993 | Anada et al. |
| 5,530,961 A | 6/1996 | Janay et al. |

(Continued)

FOREIGN PATENT DOCUMENTS

| DE | 1183868 A1 | 3/2002 |
| EP | 0564832 A1 | 10/1993 |

(Continued)

OTHER PUBLICATIONS

"U.S. Appl. No. 09/980,271, Advisory Action mailed Aug. 10, 2006", 4 pgs.

(Continued)

*Primary Examiner* — Pankaj Kumar
*Assistant Examiner* — Reuben M Brown
(74) *Attorney, Agent, or Firm* — Schwegman Lundberg & Woessner, P.A.

(57) ABSTRACT

The present invention concerns a system (10) and a process for authenticating a PIN code of a user in an interactive information system in order to run an application. It comprises input means (15) for PIN code entry, security manager means (13) for comparing the PIN code of the user upon a request for user authentication from the application, with a registered PIN code, and giving authorization to run said application if the PIN code of the user matches with the registered PIN code, and display means (17) for displaying any graphics including a PIN entry field. The request for user authentication is provided on the display means via the Pin entry field with the look and feel of said application. The system further comprises emitting means for entering crypted digits, the security manager means (13) being arranged to give authorization to run the application after full entry of said crypted digits and if the PIN code of the user is identical to the registered PIN code.

20 Claims, 5 Drawing Sheets

(56) References Cited

U.S. PATENT DOCUMENTS

| | | | |
|---|---|---|---|
| 5,550,575 | A | 8/1996 | West et al. |
| 5,655,077 | A | 8/1997 | Jones et al. |
| 5,664,099 | A * | 9/1997 | Ozzie et al. ............... 726/29 |
| 5,675,647 | A | 10/1997 | Garneau et al. |
| 5,682,325 | A | 10/1997 | Lightfoot et al. |
| 5,724,272 | A | 3/1998 | Mitchell et al. |
| 5,724,423 | A * | 3/1998 | Khello ............... 713/184 |
| 5,754,173 | A | 5/1998 | Hiura et al. |
| 5,812,776 | A | 9/1998 | Gifford |
| 5,870,723 | A | 2/1999 | Pare, Jr. et al. |
| 5,875,394 | A | 2/1999 | Daly et al. |
| 5,969,748 | A * | 10/1999 | Casement et al. ............... 725/27 |
| 6,122,741 | A | 9/2000 | Patterson et al. |
| 6,128,655 | A | 10/2000 | Fields et al. |
| 6,267,564 | B1 * | 7/2001 | Rapheal ............... 417/234 |
| 6,338,138 | B1 | 1/2002 | Raduchel et al. |
| 6,516,465 | B1 | 2/2003 | Paskins |
| 6,615,353 | B1 | 9/2003 | Hashiguchi |
| 6,628,305 | B1 | 9/2003 | Hong et al. |
| 7,996,861 | B1 | 8/2011 | Delpuch |
| 2003/0028885 | A1 * | 2/2003 | Wilcox et al. ............... 725/60 |

FOREIGN PATENT DOCUMENTS

| | | | |
|---|---|---|---|
| EP | 1183868 | A1 | 3/2002 |
| ES | 1183868 | A1 | 3/2002 |
| FR | 1183868 | A1 | 3/2002 |
| GB | 1183868 | A1 | 3/2002 |
| HK | 1046489 | A1 | 11/2004 |
| IT | 1183868 | A1 | 3/2002 |
| JP | 2003501967 | A | 1/2003 |
| WO | WO-9719555 | A1 | 5/1997 |
| WO | WO-9800968 | A1 | 1/1998 |
| WO | WO-9837695 | A1 | 8/1998 |
| WO | WO-0076215 | A1 | 12/2000 |

OTHER PUBLICATIONS

"U.S. Appl. No. 09/980,271, Appeal Brief filed Feb. 5, 2007", 21 pgs.

"U.S. Appl. No. 09/980,271, Appeal Brief filed May 7, 2007", 21 pgs.

"U.S. Appl. No. 09/980,271, Applicant's Summary of Examiner Interview filed Feb. 14, 2011", 6 pgs.

"U.S. Appl. No. 09/980,271, Decision on Appeal mailed Sep. 27, 2010", 8 pgs.

"U.S. Appl. No. 09/980,271, Decision on Pre-Appeal Brief Request mailed Nov. 3, 2006", 2 pgs.

"U.S. Appl. No. 09/980,271, Examiner Interview Summary mailed Jan. 14, 2011", 3 pgs.

"U.S. Appl. No. 09/980,271, Examiner Interview Summary mailed Feb. 8, 2011", 3 pgs.

"U.S. Appl. No. 09/980,271, Examiner's Answer to Appeal Brief mailed Sep. 7, 2007", 12 pgs.

"U.S. Appl. No. 09/980,271, Final Office Action mailed Apr. 20, 2006", 8 pgs.

"U.S. Appl. No. 09/980,271, Non Final Office Action mailed Oct. 5, 2005", 8 pgs.

"U.S. Appl. No. 09/980,271, Notice of Allowance mailed Apr. 1, 2011", 5 pgs.

"U.S. Appl. No. 09/980,271, Pre Appeal Brief Request filed Sep. 11, 2006", 7 pgs.

"U.S. Appl. No. 09/980,271, Reply Brief filed Nov. 7, 2007", 9 pgs.

"U.S. Appl. No. 09/980,271, Response filed Jan. 9, 2006 to Non Final Office Action mailed Oct. 5, 2005", 9 pgs.

"U.S. Appl. No. 09/980,271, Response filed Jun. 20, 2006 to Final Office Action mailed Apr. 20, 2006", 10 pgs.

"European Application Serial No. 99973889.1, Amendment filed Sep. 4, 2003", 20 pgs.

"European Application Serial No. 99973889.1, Notice of Opposition filed Sep. 28, 2004", 1 pg.

"European Application Serial No. 99973889.1, Office Action mailed Feb. 24, 2003", 5 pgs.

"European Application Serial No. 99973889.1, Office Action mailed Mar. 8, 2007", 6 pgs.

"European Application Serial No. 99973889.1, Office Action mailed Apr. 11, 2002", 2 pgs.

"European Application Serial No. 99973889.1, Office Action mailed Jun. 22, 2007", 3 pgs.

"European Application Serial No. 99973889.1, Response filed Oct. 17, 2002 to Office Action mailed Apr. 11, 2002", 15 pgs.

"European Application Serial No. 99973889.1, Response to Notice of Opposition filed Apr. 4, 2005", 11 pgs.

"International Application Serial No. PCT/IB1999/001213, International Search Report mailed Feb. 15, 2000", 3 pgs.

"International Application Serial No. PCT/IB1999/01213, International Preliminary Examination Report mailed Aug. 2, 2001", 10 pgs.

"International Application Serial No. PCT/IB1999/01213, Written Opinion mailed Mar. 7, 2001", 10 pgs.

"Internet Archive Wayback Machine: Search Results for Jan. 1, 1996-Mar. 2, 2005", [Online]. Retrieved from the Internet: <URL: http://web.archive.org/web/* /http:/ /www.gwdg.de>, (Mar. 2, 2005), 2 pgs.

Dapper, Thomas, et al., "Windows NT 4.0: improfessionellen Einsatz", (1997), 144-153, 475-485, 694-697, 701-702, 799-804.

Ibleiber, Andreas, "Windows NT 4.0: Server Administratorkurs", (1999), 10 pgs.

U.S. Appl. No. 09/980,271, filed Nov. 30, 2001, Flexible Interface for Secure Input of Pin Code.

* cited by examiner

FLEXIBLE INTERFACE FOR SECURE INPUT OF PIN CODE

This application is a continuation of U.S. patent application Ser. No. 09/980,271, filed Nov. 30, 2001 entitled "Flexible Interface for Secure Input of Pin Code, which is a 371 of international application PCT/IB99/01213 filed Jun. 4, 1999.

The invention is related to interfaces between man and machine such as computer, telephone or television devices, which need a Personal Identification Number (PIN) to authenticate the user running an application.

By running an application, one should understand to continue or to have access to an application or to specific resources of an application.

The invention is more particularly but not exclusively related to a system and a method Used in an interactive information system such as an entertainment system.

Requirements for security in interactive entertainment systems are contradictory.

This is because, in order to run an application, an authentication of the user/viewer is needed while using the specific look and feel of the application.

However, it is also preferred that the PIN code should not be given to the application for security purpose.

In fact, two types of solutions are presently known for authentication. Both present drawbacks, as they are only capable of fulfilling part of the above requirements.

Either the application presents its own user interface for PIN entry, then queries the underlying system to check if the given PIN is correct.

This solution does not hide the PIN code from the application.

Or the application requests the underlying system to authenticate the viewer. For this the underlying system, using its own look and feel, prompts the viewer for its PIN, verifies its validity then returns the information that the viewer is authorised or not to the application.

This solution is safe, but does not allow integration of the PIN entry with the application look and feel.

Figure 1:
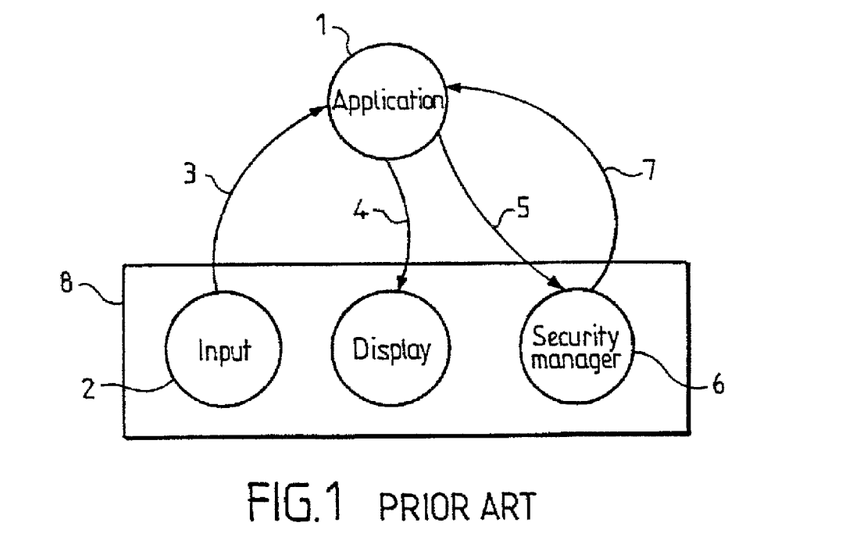
FIGS. 1 and 2, already mentioned, are schematic drawings figuring the architecture of the PIN code interface of the prior art.

In other words and referring to FIG. 1, it is shown a system which presents a good look and feel, but which is not safe, as the PIN code is known by the application.

More precisely, the application 1 has total control of the look and feel.

The viewer provides his PIN code through input means 2 in digital data to the application via an input device, for instance transmitted as infrared signals 3 to the device on which runs the application which displays in 4 the look and feel for the PIN entry field.

Such application, which is now aware of the PIN code, transmits it in 5 to security manager means 6 which, after checking, confirms in 7 authorisation from the system 8.

The PIN code (Input means 2) is therefore provided outside of the system 9, which is unsecured, and may allows third parties to have access to the PIN code.

Figure 2:
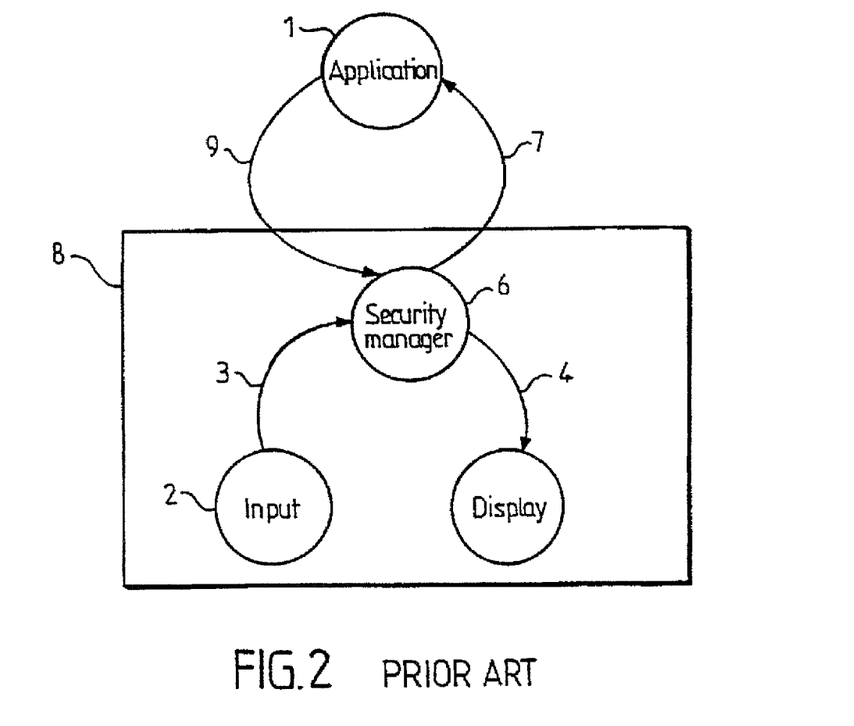

FIG. 2 displays the other way of functioning of a known system of the prior art.

Here, the application 1 has no control over the look and feel, contrarily to the precedent case.

The application 1 requests in 9 the system 8 to identify the user.

The security manager moans 6 uses the input means 2 (PIN code), provided in 3 and the display screen to create in 4 a display of the PIN entry field.

When the security manager means 6 has checked the PIN code, it gives authorisation (7) to display or to access to resource to the application 1.

On a security point of view this system is good as, at no point, the system 8 gives out the PIN code to the application.

However, the look and feel is here totally under system control, without any consideration for the current application look and feel.

It is therefore a main object of the present invention to provide an improved system and method for authorising a secure way of authentication for an access to an application through a PIN code while using the look and feel of paid application during the PIN code interrogation.

It is another object of the invention to provide an improved system and method wherein the safety needed for PIN code entry, is combined with perfect integration of the prompt with the service.

It is another objet of the invention to provide a simple and coat saving flexible interface for secure input of a PIN code.

The problems outlined above are in large part solved by a system for authenticating a PIN code of a user in an interactive information system, in order to run an application which comprises:

input means for PIN code entry, security manager means for comparing the PIN code of the user, upon a request for user authentication from the application, with a registered PIN code, and giving authorisation to run said application if said PIN code of the user matches the registered PIN code, and display means for displaying any graphics including a PIN entry field, characterised in that the request for user authentication being provided on the display means via the PIN entry field with the look and feel of said application, the system further comprises emitting means for entering crypted digits in said PIN entry field upon entering the PIN code of the user in the security manager means through said input means, and the security manager means are arranged to give authorisation to run the application after full entry of said crypted digits and if the PIN code of the user is identical to the registered PIN code.

With such system the PIN code remains hidden from the environment, the user having only the impression to enter physically his PIN code within the PIN entry field of the application. In fact, it remains in the security manager means, which is within the system.

In a preferred embodiment the application is a television program.

The invention also provides a method for authenticating a PIN code of a user in an interactive information system, in order to run an application, wherein said information system emits a request for authenticating a user, said user enters a PIN code through input means, said PIN code of the user is compared with a registered PIN code, within security manager means, and authorisation is provided to run said application if the PIN code of the user matches with the registered PIN code, characterised in that the request for authenticating being provided with a PIN entry field having the look and feel of the application, crypted digits are entered in said PIN entry field, upon entering the PIN code by the user in the security manager means, and authorisation to display the application is only provided after full entry of said crypted digits, and if the PIN code signal of the user is identical to the registered PIN code as checked by the security manager means.

Figure 3:
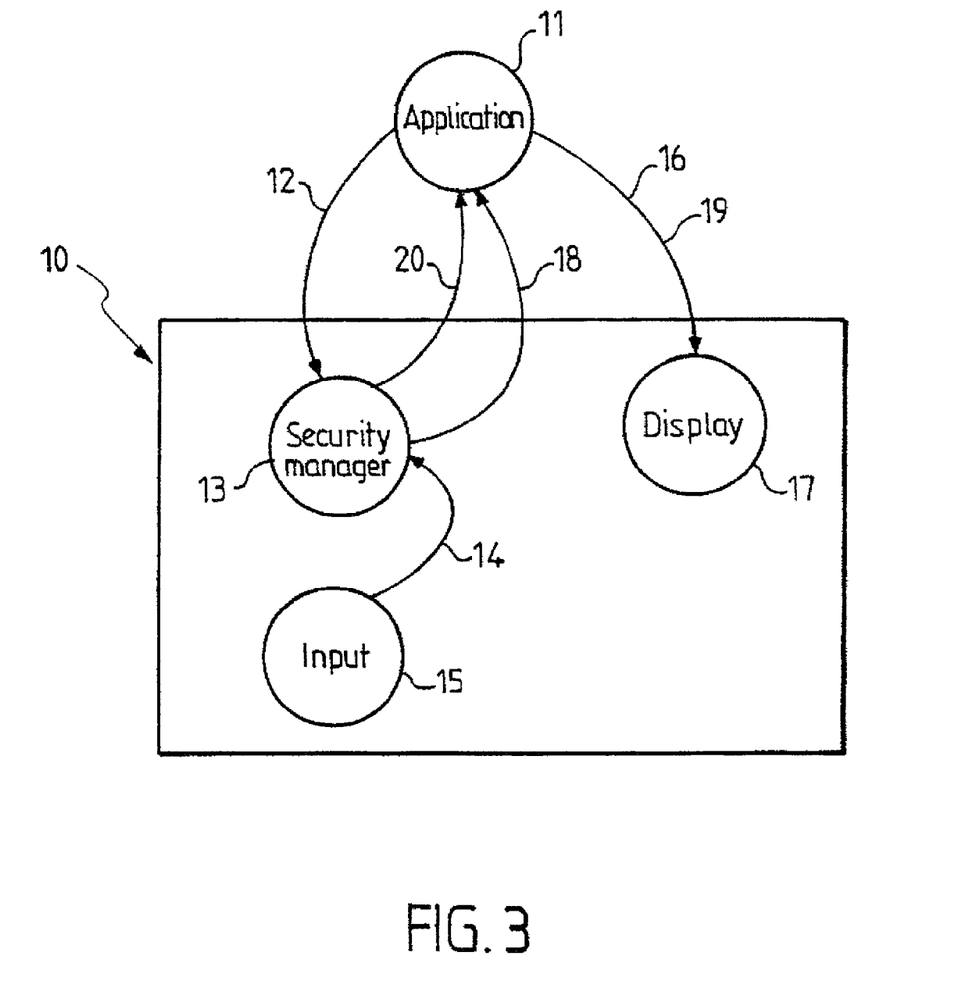
FIG. 3 is a schematic drawing showing the architecture of the system according to the present invention.

The invention will be better understood from reading the following description of a particular embodiment given by way of non limiting example, and which refers, additionally to the above mentioned figures showing the prior art, to the accompanying drawings in which:

FIG. 3 shows a system 10 arranged to authenticate the user before running an application 11, according to the invention.

The application 11 initiates a PIN entry request 12 to authenticate the user request and simultaneously asks the security manager means 13 to handle key input 14 to be introduced through Input means 15, for instance through a key pad.

The security manager means 13 comprises a small computer system including a central processing unit (CPU), memory and local storage. It is connected to input/output ports.

It is programmed in order to provide the different steps according to the method of the invention.

The application having total control over the graphics displayed and their look and feel, the look and feel 16 for PIN entry is provided on display means 17 according to the application.

The display means can be a TV screen, an LCD screen of a remote portable telephone, etc.

As the security manager means 13 is asked to enter the PIN entry mode, it grabs key inputs 14, analyses these inputs for user authentication and relays in 18 the key presses to the application.

The security manager means does not relay the key values, which therefore remains within the system, but only relays the fact that a key has been pressed, letting for instance the application display an X for each key pressed, in the PIN entry field.

This way the application does not learn about the PIN, but can give user feedback 19 to the display means 17.

When the security manager means 13 recognises the PIN, it informs in 20 the application that the user/viewer has been authenticated.

The application can then run, be displayed and/or operate.

Figure 4:
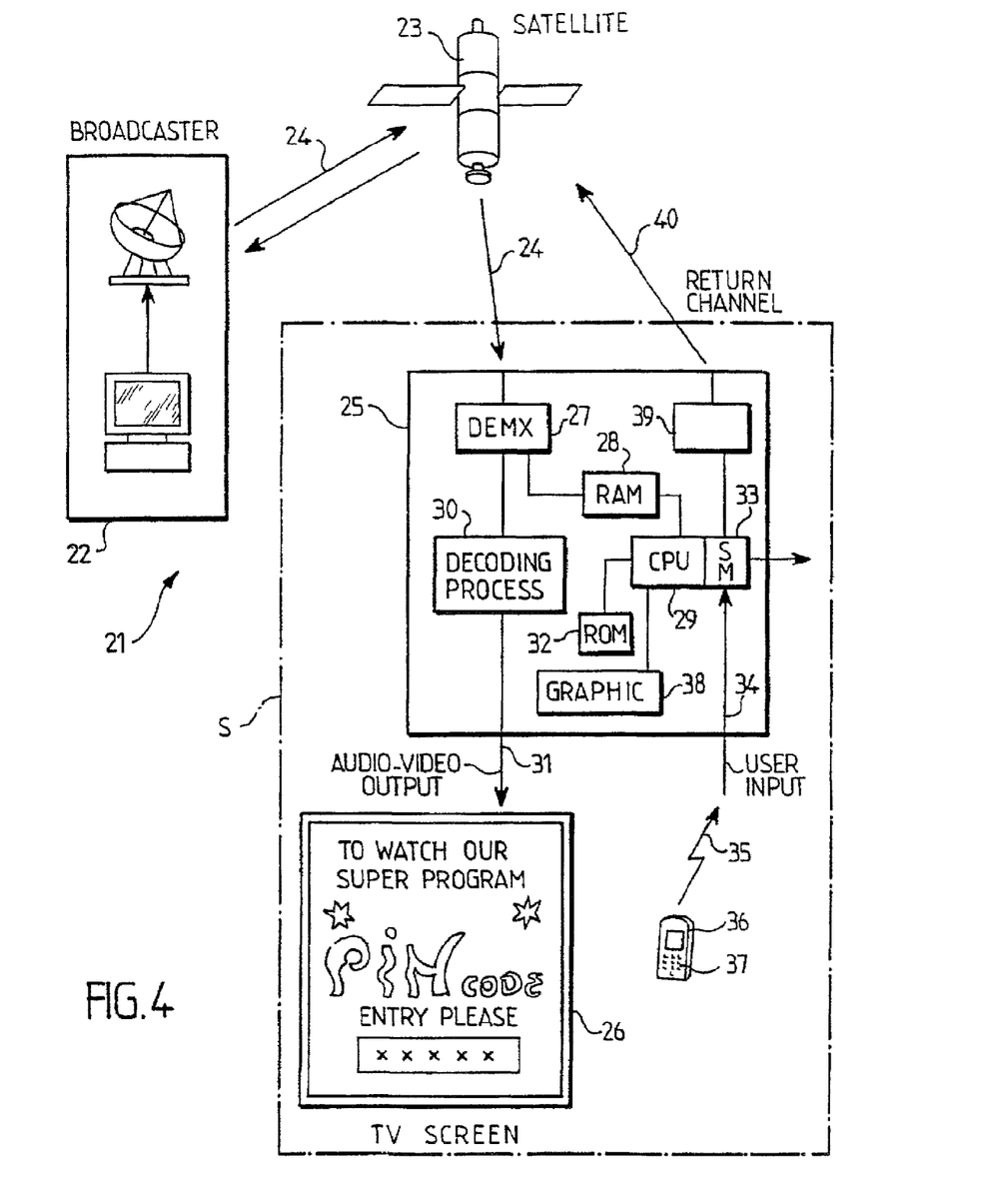
FIG. 4 is a schematic drawing showing an interactive television system for implementing the invention.

FIG. 4 shows schematically an interactive television system 21 including a system S according to the embodiment of the invention more particularly described here.

A broadcaster 22 transmit through a satellite 23 the signal corresponding to the look and feel of an application request (arrows 24), for instance a Pay TV program.

The signal is provided to a digital interactive decoder 25, currently packaged in a set-top connected to a television 26.

It delivers true interactive television using the broadcast-oriented infrastructure currently predominant in the television industry.

The decoder 25 comprises in a manner known per se, a demultiplexer 27 and an application programming interface 28, stored in a local memory (RAM, EPROM FLASH memory, . . . ), such as the one proposed by the applicant OPEN TV, and which provides a library of functions which can display graphics on the television screen, control audio/video services, accept user input-and communicate with the outside world.

The decoder 25 also comprises a CPU 29, Audio/Video decoding means 30, connected through audio video output 31 to the television set 26, storage means 32 for storing an operating system for the CPU 29, such as the one provided by OPEN TV.

The CPU 29 further includes part of the security manager means 33 as described in the invention.

The decoder 25 also comprises Input means 34 such as infrared sensors arranged to receive infrared signals 35 emitted by a remote control apparatus 36 having a key pad 37, and display function means 38 controlled by the CPU.

The decoder 25 also comprises output means having a modem and/or a multiplexer 39 for providing back return signals 40 on a return channel to the broadcaster 22 and/or a server.

The broadcast system may be, of course based on satellite or cable or same other medium.

Figure 5:
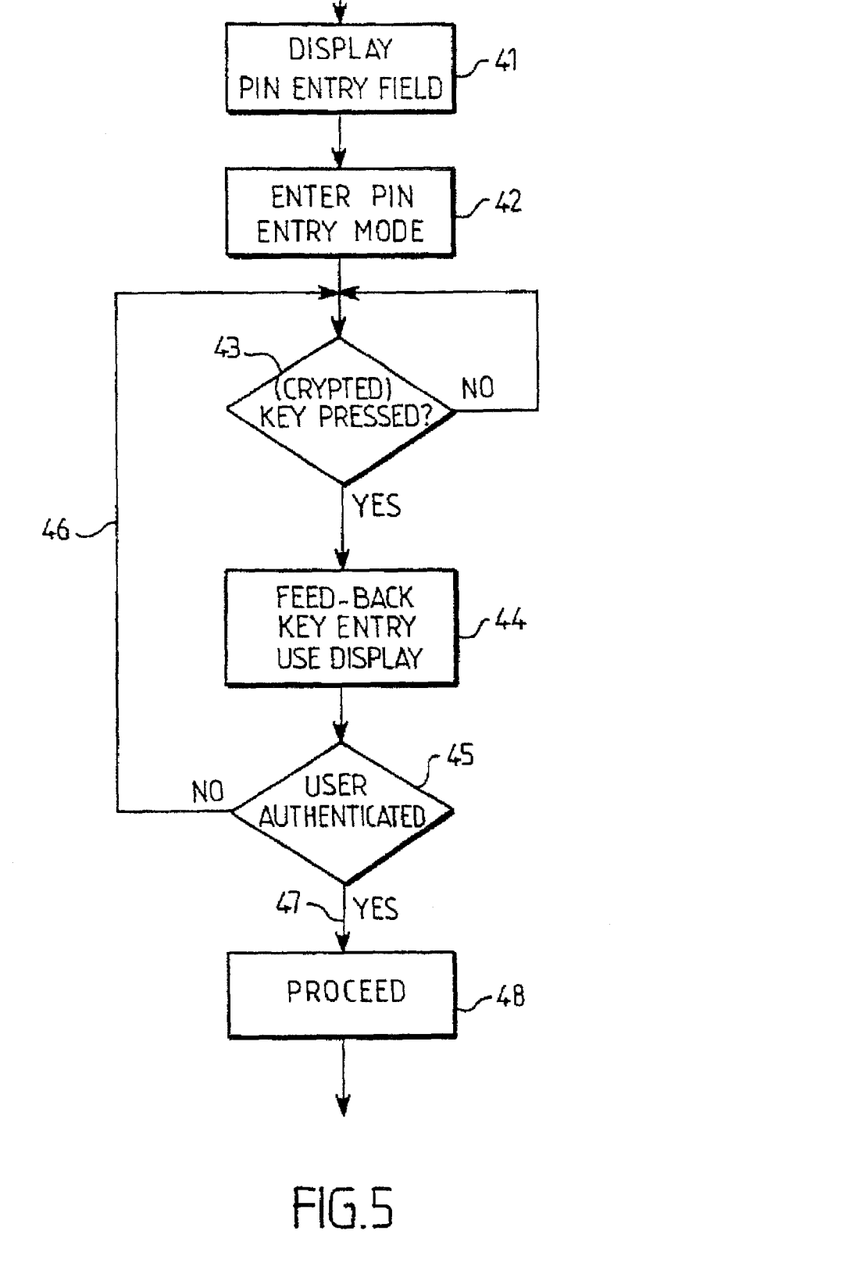
FIG. 5 is a flowchart related to the application according to the embodiment of the invention more particularly described here.

FIG. 5 shows a block diagram according to an embodiment of the invention to be included in an application to authenticate the users to continue or to have access to specific resources which needs authentication by a PIN code.

The application first uses some display function (block 41) to present a PIN entry field to the viewer.

It then asks the security manager means to enter the PIN entry mode and check in 43 if keys are pressed.

As keys are pressed, it gives (block 44) feedback using the display function.

If the user is not authenticated (step 45), it comes back (loop 46) to check 43.

If the user is authenticated(in 47), there is an OK from the security manager means and the application can go on (step 48).

Figure 6:
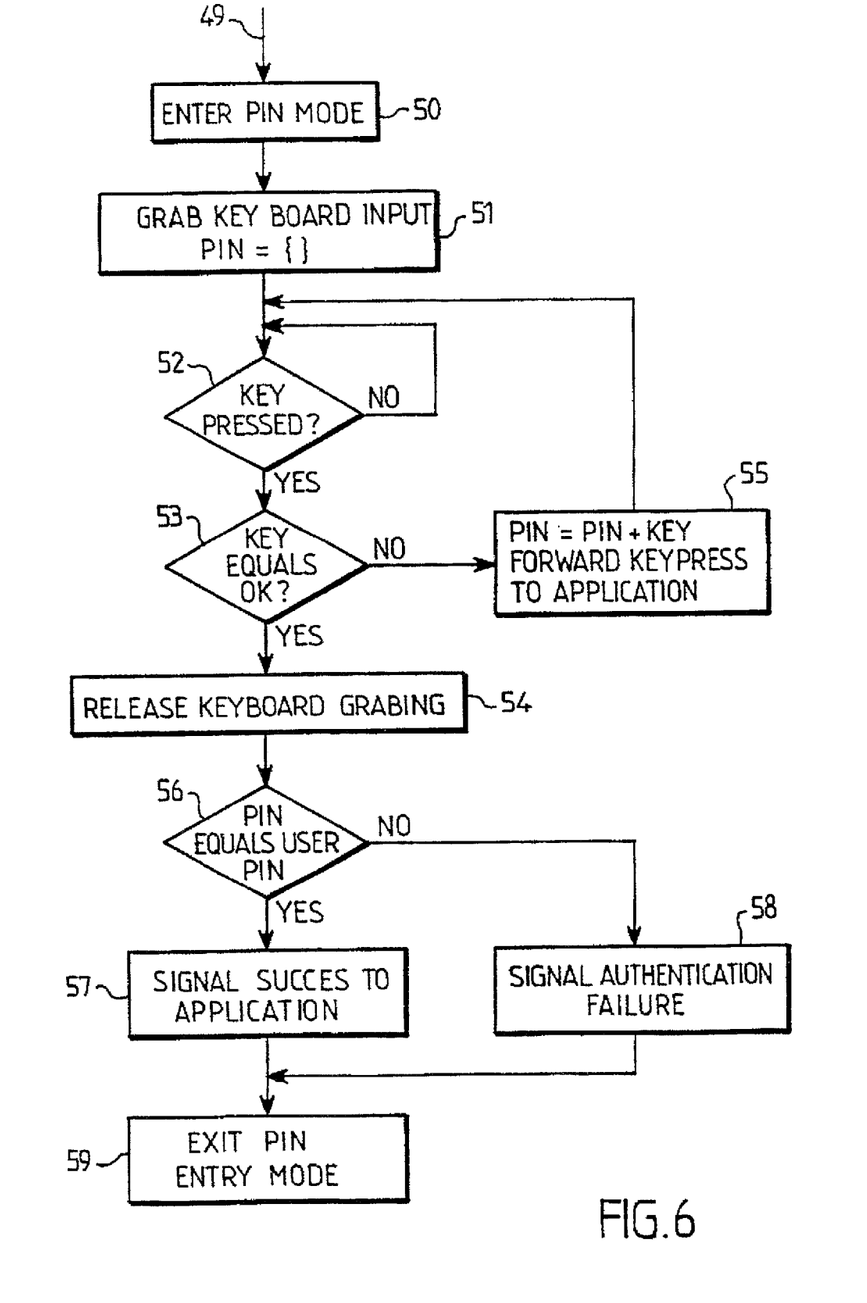
FIG. 6 is a flowchart implemented by the security manager means according to the embodiment of the invention more particularly described here.

An example of a block diagram of the security manager program is provided on FIG. 6 and is performed entirely (and secretly) within the System S.

At the application request in 49, the security manager means enters a PIN entry mode (step 50).

The PIN repertory is then initialised to empty in 51 and the system wait for a key to be pressed (check 52).

If the key is an <ending> key (for instance OK or enter), (check S3) there ie a release of the key input grabbing (step S4).

If not there is a loop 55 for more key.

After release of the key input grabbing, the security manager means checks in 56 the entered PIN against the user's PIN.

It then either returns success (step 57), or failure (step 58) to application (step 45 of the application), before exiting PIN entry mode in 59.

It will now be described the functioning of the system while referring to FIG. 4.

At the broadcast site, pay TV programs of a Specific Provider are stored.

The pay TV programs are encoded into a digital bitstream which is compressed and multiplexed with the signal of the PIN code field of the Specific Provider, including its logo and a menu to allow the viewer to have access to other movies of the provider, to form a single bitstream.

This single bitstream is then broadcasted to all subscribers. At each customer's site, the bitstream is received by the decoder 25 where the audio and video are decompressed and the PIN cods field is sent to the customer's television set 26.

The request for the PIN code of the user is therefore prompted to the viewer.

The viewer then, for instance through a remote control apparatus, can enter his PIN code by pressing keys.

At each pressing, a cross appears in the PIN entry field on the TV Screen.

Meanwhile the Security manager means 33 compares the PIN code with a preregistered user's PIN code entered before in the decoder for instance via a modem.

If the PIN codes matches, signals are sent to the application decoding process 30, and such decoding process is then authorised for displaying the application on the TV set.

Additional advantages and modifications will readily occur to those skilled in the art. Therefore the present invention in its broader aspects is not limited to the specific details, representative devices and illustrated examples shown and described herein.

For instance, it also includes application to PIN code entry for obtaining specific services through mobile phone, for instance via GSM, or other specific services via Television and/or Internet.

The invention claimed is:

1. A method of authenticating a personal identification number (PIN) code of a user to access an application, the method comprising:
   presenting, by the application via a display device to a user, a PIN code entry field;
   issuing, by the application to a security manager, an authentication request;
   capturing, by the security manager in response to the authentication request, characters of a PIN code entered by the user;
   issuing, by the security manager to the application, for each of the characters entered by the user, an indication that the character was entered;
   presenting, by the application via the display device to the user, a preset character in the PIN code entry field for each of the characters entered by the user;
   comparing, by the security manager, the PIN code entered by the user to a preregistered PIN code of the user;
   indicating, by the security manager, success in authenticating the user in response to the PIN code entered by the user matching the preregistered PIN code of the user; and
   indicating, by the security manager, failure in authenticating the user in response to the PIN code entered by the user not matching the preregistered PIN code of the user.

2. The method of claim 1, further comprising:
   permitting, by the application in response to the indicating of the success in authenticating the user, interaction of the user with the application.

3. The method of claim 1, further comprising:
   enabling, in response to the indicating of the success in authenticating the user, presentation of the application to the user via the display device.

4. The method of claim 1, further comprising:
   preventing, by the application in response to the indicating of the failure in authenticating the user, interaction of the user with the application.

5. The method of claim 1, further comprising:
   preventing, in response to the indicating of the failure in authenticating the user, presentation of the application to the user via the display device.

6. The method of claim 1, wherein the capturing of the characters of the PIN code further comprises:
   obtaining, by the security manager in response to the authentication request, control of a user text entry capture mode;
   capturing, by the security manager during the user text entry capture mode, the characters of the PIN code entered by the user;
   receiving, by the security manager during the user text entry capture mode, a PIN code exit character; and
   releasing, by the security manager in response to receiving the PIN code exit character, control of the user text entry capture mode.

7. The method of claim 1, wherein the PIN code entry field is presented in a particular look-and-feel of the application.

8. The method of claim 1, wherein the application comprises a television program.

9. The method of claim 1, wherein the security manager operates on a television set-top box.

10. An apparatus, comprising:
    at least one processor; and
    a data storage device including a security manager module comprising instructions that, when executed by the at least one processor, cause the at least one processor to perform operations comprising:
    receiving, by the security manager from an application, an authentication request for a user to access the application;
    capturing, by the security manager in response to the authentication request, characters of a PIN code entered by the user;
    issuing, by the security manager to the application, for each of the characters entered by the user, an indication that the character was entered;
    comparing, by the security manager, the PIN code entered by the user to a preregistered PIN code of the user;
    indicating, by the security manager, success in authenticating the user in response to the PIN code entered by the user matching the preregistered PIN code of the user; and
    indicating, by the security manager, failure in authenticating the user in response to the PIN code entered by the user not matching the preregistered PIN code of the user.

11. The apparatus of claim 10, wherein the capturing of the characters of the PIN code further comprises:
    obtaining, by the security manager in response to the authentication request, control of a user text entry capture mode;
    capturing, by the security manager during the user text entry capture mode, the characters of the PIN code entered by the user;
    receiving, by the security manager during the user text entry capture mode, a PIN code exit character; and
    releasing, by the security manager in response to receiving the PIN code exit character, control of the user text entry capture mode.

12. The apparatus of claim 10, wherein the security manager operates on a television set-top box.

13. A non-transitory computer-readable storage medium comprising instructions for an application that, when executed by at least one processor of a machine, cause the machine to perform operations comprising:
    presenting, by the application via a display device to a user, a PIN code entry field;
    issuing, by the application to a security manager, an authentication request;

receiving, by the application from the security manager, for each of the characters entered by the user, an indication that the character was entered;

presenting, by the application via the display device to the user, a preset character in the PIN code entry field for each of the characters entered by the user;

receiving, by the application from the security manager, an indication of success in authenticating the user in response to the PIN code entered by the user matching a preregistered PIN code of the user; and receiving, by the application from the security manager, an indication of failure in authenticating the user in response to the PIN code entered by the user not matching the preregistered PIN code of the user.

14. The non-transitory computer-readable storage medium of claim 13, further comprising:

permitting, by the application in response to the indicating of the success in authenticating the user, interaction of the user with the application.

15. The non-transitory computer-readable storage medium of claim 13, further comprising:

enabling, by the application in response to the indicating of the success in authenticating the user, presentation of the application to the user via the display device.

16. The non-transitory computer-readable storage medium of claim 13, further comprising:

preventing, by the application in response to the indicating of the failure in authenticating the user, interaction of the user with the application.

17. The non-transitory computer-readable storage medium of claim 13, further comprising:

preventing, by the application in response to the indicating of the failure in authenticating the user, presentation of the application to the user via the display device.

18. The non-transitory computer-readable storage medium of claim 13, wherein the PIN code entry field is presented in a particular look-and-feel of the application.

19. The non-transitory computer-readable storage medium of claim 13, wherein the application comprises one of a television program and a service provided on a mobile communication device.

20. The non-transitory computer-readable storage medium of claim 13, wherein a single apparatus comprises the security manager and the display device.

* * * * *